(12) United States Patent
Nahmias Nanni et al.

(10) Patent No.: US 10,759,229 B2
(45) Date of Patent: Sep. 1, 2020

(54) HIGH PERFORMANCE TYRE FOR VEHICLE WHEELS

(71) Applicant: Pirelli Tyre, S.p.A., Milan (IT)

(72) Inventors: Marco Nahmias Nanni, Milan (IT); Luca Giannini, Milan (IT); Angela Lostritto, Breuberg (DE)

(73) Assignee: PIRELLI TYRE S.p.A., Milan (IT)

( * ) Notice: Subject to any disclaimer, the term of this patent is extended or adjusted under 35 U.S.C. 154(b) by 431 days.

(21) Appl. No.: 14/575,015

(22) Filed: Dec. 18, 2014

(65) Prior Publication Data
US 2015/0165821 A1 Jun. 18, 2015

Related U.S. Application Data

(63) Continuation of application No. 14/119,028, filed as application No. PCT/IB2012/052540 on May 21, 2012, now abandoned.
(Continued)

(30) Foreign Application Priority Data

May 30, 2011 (IT) .............................. MI2011A0974

(51) Int. Cl.
B60C 11/00 (2006.01)
B60C 1/00 (2006.01)
(Continued)

(52) U.S. Cl.
CPC .............. B60C 9/1821 (2013.01); B60C 1/00 (2013.01); B60C 5/12 (2013.01); B60C 11/005 (2013.01);
(Continued)

(58) Field of Classification Search
CPC ... B60C 1/0016; B60C 11/00; B60C 11/0041; B60C 11/005
See application file for complete search history.

(56) References Cited

U.S. PATENT DOCUMENTS 2,689,841 A * 9/1954 Augustin ............... C08K 3/346
524/445
4,136,103 A 1/1979 Oswald
(Continued)

FOREIGN PATENT DOCUMENTS

EP 0 691 218 1/1996
EP 0 718 122 6/1996
(Continued)

OTHER PUBLICATIONS

Machine translation of JP 2005-219523, 2005.*
(Continued)

Primary Examiner — Justin R Fischer
(74) Attorney, Agent, or Firm — Finnegan, Henderson, Farabow, Garrett & Dunner, L.L.P.

(57) ABSTRACT

A tyre for vehicle wheels, includes a carcass structure including at least one carcass layer, a belt structure applied in a radially outer position with respect to the carcass structure, a tread band applied in a radially outer position with respect to the belt structure, and at least one layer of elastomeric material applied in a radially inner position with respect to the tread band; in which the at least one elastomeric material layer includes inorganic fibres of magnesium and/or aluminium silicates of nanometric dimensions.

17 Claims, 3 Drawing Sheets

Related U.S. Application Data

(60) Provisional application No. 61/510,631, filed on Jul. 22, 2011.

(51) Int. Cl.
  B60C 9/18 (2006.01)
  B60C 11/18 (2006.01)
  C08K 7/04 (2006.01)
  B60C 5/12 (2006.01)
  C08K 7/10 (2006.01)

(52) U.S. Cl.
  CPC ............... *B60C 11/18* (2013.01); *C08K 7/04* (2013.01); *C08K 7/10* (2013.01); *B60C 2001/0075* (2013.01); *Y10T 152/10513* (2015.01)

(56) References Cited

U.S. PATENT DOCUMENTS

| | | | |
|---|---|---|---|
| 4,419,273 A * | 12/1983 | Santilli | C10G 25/003 |
| | | | 502/80 |
| 4,735,247 A * | 4/1988 | Makino | B60C 9/18 |
| | | | 152/209.18 |
| 5,006,603 A | 4/1991 | Takaki et al. | |
| 5,747,560 A | 5/1998 | Christiani et al. | |
| 5,952,093 A | 9/1999 | Nichols et al. | |
| 6,598,645 B1 | 7/2003 | Larson | |
| 6,698,483 B2 | 3/2004 | Pagano et al. | |
| 7,601,772 B2 | 10/2009 | Fudemoto | |
| 7,649,043 B2 | 1/2010 | Bergman | |
| 7,910,511 B2 * | 3/2011 | Ronne | A01N 59/16 |
| | | | 502/258 |
| 2002/0179215 A1 | 12/2002 | Farinola | |
| 2003/0144401 A1 | 7/2003 | Ajbani et al. | |
| 2005/0090584 A1 | 4/2005 | Powell | |
| 2006/0137797 A1 | 6/2006 | Galimberti et al. | |
| 2006/0173115 A1 | 8/2006 | Fudemoto et al. | |
| 2006/0196591 A1 | 9/2006 | Yoshikawa et al. | |
| 2007/0006958 A1 | 1/2007 | Wright | |
| 2007/0173585 A1 * | 7/2007 | Sevenich | D01F 6/62 |
| | | | 524/445 |
| 2009/0065117 A1 | 3/2009 | Caprio et al. | |
| 2009/0218026 A1 | 9/2009 | Giannini et al. | |
| 2009/0250151 A1 | 10/2009 | Galimberti et al. | |
| 2010/0059158 A1 | 3/2010 | Baione et al. | |
| 2010/0078110 A1 | 4/2010 | Sandstrom et al. | |
| 2010/0190907 A1 | 7/2010 | Mizuno et al. | |

FOREIGN PATENT DOCUMENTS

| | | |
|---|---|---|
| EP | 1 193 085 A2 | 4/2002 |
| EP | 1 262 338 A1 | 12/2002 |
| EP | 1 310 385 A2 | 5/2003 |
| EP | 1 535 762 A1 | 6/2005 |
| EP | 2 179 865 | 4/2010 |
| FR | 2 670 160 A1 | 12/1991 |
| FR | 2 812 298 A1 | 2/2002 |
| GB | 1327197 * | 8/1973 |
| JP | 59-126442 | 7/1984 |
| JP | 60-15203 * | 1/1985 |
| JP | 9-175123 | 7/1997 |
| JP | 11-246707 | 9/1999 |
| JP | 2005-219523 * | 8/2005 |
| JP | 2006-131718 | 5/2006 |
| JP | 2006-151329 A | 6/2006 |
| WO | WO 99/48962 A1 | 9/1999 |
| WO | WO 00/24596 | 5/2000 |
| WO | WO 01/03954 | 1/2001 |
| WO | WO 01/60643 A1 | 8/2001 |
| WO | WO 02/096673 A1 | 12/2002 |
| WO | WO 2004/052981 A1 | 6/2004 |
| WO | WO 2004/056586 | 7/2004 |
| WO | WO 2006/010479 A1 | 2/2006 |
| WO | WO 2007/062671 | 6/2007 |
| WO | WO 2009/080091 | 7/2009 |
| WO | WO 2010/016976 A1 | 2/2010 |
| WO | WO 2010/069341 | 6/2010 |
| WO | WO 2011/012944 | 2/2011 |
| WO | WO 2012/164433 | 12/2012 |
| WO | WO 2012/164436 | 12/2012 |

OTHER PUBLICATIONS

International Search Report from the European Patent Office for International Application No. PCT/IB2012/052550, dated Aug. 1, 2012.
Written Opinion of the International Searching Authority from the European Patent Office for International Application PCT/IB2012/052550, dated Aug. 1, 2012.
Pangel B-5, Rheological Additives for Low Polarity Systems, Tolsa Group, (http://www.tolsa.com, 1 page (2008).
Galan, Clay Minerals, vol. 31 at p. 443 (1996).
Juliana A. de Lima et al., *A new approach to sepiolite dispersion by treatment with ionic liquid*, Applied Clay Science 143 (2017) 234-240.
Haydn H. Murray, Applied Clay Mineralogy (2007).
Mackenzie, "The Classification and Nomenclature of Clay Minerals," Clay Minerals, vol. 4, Issue 21, pp. 52-66 (Aug. 1959).
http://www.handbookofmineralogy.org/pdfs/palygorskite.pdf "Palygorskite $(Mg,Al)_2Si_4O_{10}(OH)$-$4H_2O$." dated 2001 Mineral Data Publishing, version 1.2 (1 pg.).
http://www.handbookofmineralogy.org/pdfs/kaolinite.pdf "Kaolinite $Al_2Si_2O_5(OH)_4$," dated 2001 Mineral Data Publishing, version 1.2 (2 pgs.).
http://www.handbookofmineralogy.org/pdfs/halloysite.pdf "Halloysite $Al_2Si_2O_5(OH)_4$, " dated 2001 Mineral Data Publishing, version 1.2 (1 pg.).
http://www.handbookofmineralogy.org/pdfs/allophane.pdf "Allophane $Al_2O_3$ 1.3-2.0$(SiO_2)$ 2.5-3.0$(H_2O)$," dated 2001 Mineral Data Publishing, version 1.2 (1 pg.).
Translation of JP 2005-219523.
http://www.webmineral.com/data/Sepiolite.shtml#.V_LyEPkrJD8, printed Nov. 2, 2016.
International Search Report from the European Patent Office for International Application No. PCT/IB2013/058800, dated Feb. 26, 2014.
International Preliminary Report on Patentability from the international Bureau and Written Opinion of the International Searching Authority from the European Patent Office for International Application No. PCT/182013/058800, dated Mar. 31, 2015.
DIN ISO 34.1; Rubber, vulcanized or thermoplastic: Determination of tear strength; Part 1: Trouser, angle and crescent test pieces (SO 34-1: 2004) Jul. 2004 (14 pgs.).
Guggenheim et al., The Structures and Microtextures of the Palygorskite-Sepiolite Group Minerals, 2011, Developments in Clay Science, vol. 3. p. 3 (Year: 2011).
Satoshi Mihara, JP 2006131718, machine translation (Year: 2006).
International Search Report from the European Patent Office for International Application No. PCT/IB2013/059596, dated Mar. 6, 2014.
Dynamic Light Scattering Training Achieving reliable nano particle sizing available at http://149.171.168.221/partcalUwp-contenUploads/Malvern-Zetasizer-LS.pdf.
Machine translation of FR 2812298, 2002.
International Search Report from the European Patent Office for International Application No. PCT/IB2012/052554, dated Aug. 1, 2012.
Written Opinion of the International Searching Authority from the European Patent Office for International Application PCT/IB2012/052554, dated Aug. 1, 2012.
Office Action issued in U.S. Appl. No. 14/437,099, dated Apr. 20, 2017.
Final Office Action issued in U.S. Appl. No. 14/437,099, dated Nov. 16, 2017.
Giannini Declaration Under 37 C.F.R. 1.132 in U.S. Appl. No. 14/437,099, dated Apr. 12, 2018.

(56) References Cited

OTHER PUBLICATIONS

Office Action issued in U.S. Appl. No. 14/536,641, dated Dec. 5, 2016.
Final Office Action issued in U.S. Appl. No. 14/536,641, dated Mar. 31, 2017.
Advisory Action issued in the U.S. Appl. No. 14/536,641, dated Aug. 8, 2017.
Giannini Declaration Under 37 C.F.R. 1.132 in U.S. Appl. No. 14/536,641, dated Feb. 5, 2018.
Office Action issued in U.S. Appl. No. 14/430,403, dated Sep. 17, 2015.
Final Office Action issued in U.S. Appl. No. 14/430,403, dated Mar. 8, 2016.
Advisory Action issued in the U.S. Appl. No. 14/430,403, dated Aug. 2, 2016.
Office Action issued in U.S. Appl. No. 14/430,403, dated Aug. 4, 2016.
Final Office Action issued in U.S. Appl. No. 14/430,403, dated Mar. 10, 2017.
Office Action issued in U.S. Appl. No. 14/430,403, dated Feb. 22, 2018.
Giannini Declaration Under 37 C.F.R. 1.132 in U.S. Appl. No. 14/430,403, dated Jan. 12, 2018.
Second Giannini Declaration Under 37 C.F.R. 1.132 in U.S. Appl. No. 14/430,403, dated Jun. 20, 2018.
BASF Technical Bulletin ASP 802, dated Dec. 2015.
BASF Technical Bulletin NCX-1 TDS ASP 802, dated Feb. 2016.
Office Action issued in U.S. Appl. No. 14/536,641, dated Jun. 4, 2018.

\* cited by examiner

HIGH PERFORMANCE TYRE FOR VEHICLE WHEELS

CROSS REFERENCE TO RELATED APPLICATION

This application a continuation of U.S. patent application No. 14/119,028, with a 371(c) date of Feb. 11, 2014, which is a national phase application based on PCT/162012/052540, filed May 21, 2012, and claims the priority of Italian Patent Application No. MI2011A000974, filed May 30, 2011, and the benefit of U.S. Provisional Application No. 61/510,631, filed Jul. 22, 2011, the content of each application being incorporated herein by reference.

FIELD OF THE INVENTION

The present invention relates to a tyre for vehicle wheels, in particular a high-performance tyre for high-powered four-wheeled vehicles, more particularly a tyre for applications that require high operating speeds and/or extreme driving conditions.

High-performance tyres, which are commonly called "HP" or "UHP" ("High Performance" or "Ultra High Performance") tyres, are in particular those that make it possible to reach speeds above 200 km/h and up to more than 300 km/h. Examples of such tyres are those belonging to classes "T", "U", "H", "V", "Z", "W", "Y".

PRIOR ART

Patent applications WO 00/24596, EP 0691218 and WO 01/03954 describe high-performance tyres.

SUMMARY OF THE INVENTION

The applicant has observed that in the extreme use to which HP and UHP tyres are sometimes subjected, the rear tyres are submitted to stresses of the circumferential type as they must transmit large longitudinal forces during acceleration (both when increasing and when reducing speed) compared to the front tyres, which are submitted to forces both in the circumferential direction and in the transverse direction relative to this.

Based on this observation, the applicant examined the problem of improving the characteristics of structure and operation at high speeds and/or in extreme driving conditions of a high-performance tyre.

The applicant then focused attention firstly on the rear tyres and found that it is possible to obtain tyres that have improved performance during use in extreme conditions, by applying, in a radially inner position with respect to the tread band, at least one layer of an elastomeric material comprising inorganic fibres of nanometric dimensions, preferably inorganic fibres consisting of magnesium and/or aluminium silicates.

The applicant found, surprisingly, that the addition of inorganic fibres of nanometric dimensions in the layer of elastomeric material, or underlayer, arranged in a radially inner position with respect to the tread band, resulted in an increase in tyre performance in conditions of extreme use, in particular with respect to driving stability, and more particularly stability of the rear section of the vehicle.

In tests carried out on front tyres, the applicant found improvements of tyre performance in extreme conditions, although less pronounced than those that were found for the rear tyres.

Advantageously, the applicant found, moreover, that the use of inorganic fibres of magnesium and/or aluminium silicates of nanometric dimensions instead of organic fibres such as, for example aramid fibres, gave better processability of the elastomeric material both in the step of dispersing the fibres in the elastomeric material and in the step of extrusion or calendering of the semifinished product comprising the aforementioned elastomeric material.

The applicant in fact found that the addition of inorganic fibres of magnesium and/or aluminium silicates of nanometric dimensions in the elastomeric material instead of organic fibres such as, for example the aforementioned aramid fibres, or instead of a proportion of the carbon black reinforcing filler, produced an improvement of the mechanical properties of the elastomeric material and an improvement of the processability of the material owing to improvement of its rheological characteristics. The applicant noticed, however, that the elastomeric material reinforced with the aforementioned inorganic fibres of magnesium and/or aluminium silicates of nanometric dimensions showed a marked decrease in dynamic shear modulus on increasing the dynamic strain and increased hysteresis, making the material unsuitable for use in HP or UHP tyres.

The applicant carried out tests on tyres provided with an underlayer reinforced with the aforementioned fibres and, surprisingly, found improved performance in terms of stability and controllability, especially of the rear tyres.

Therefore, according to a first aspect, the present invention relates to a tyre for vehicle wheels, comprising:
- a carcass structure comprising at least one carcass layer;
- a belt structure applied in a radially outer position with respect to the carcass structure;
- a tread band applied in a radially outer position with respect to said belt structure; and
- at least one elastomeric material layer applied in a radially inner position with respect to said tread band;

in which said at least one elastomeric material layer comprises inorganic fibres of magnesium and/or aluminium silicates of nanometric dimensions.

In the present description, "fibre" means an elongated element having one dimension (length) much greater than the cross-sectional diameter and the expression "nanometric dimensions", referring to the inorganic fibres, means that the inorganic fibres have a diameter under 500 nm.

According to a preferred embodiment, said elastomeric material comprises (a) a diene elastomeric polymer and (b) inorganic fibres having a diameter under 100 nm.

Advantageously, said inorganic fibres have a diameter between 1 and 100 nm, more preferably between 5 and 50 nm.

Preferably, said inorganic fibres have a length under 10 μm, more preferably between 0.2 and 10 μm, even more preferably between 0.2 and 5 μm.

Advantageously, the inorganic fibres used in the present invention are selected from the group consisting of fibres of magnesium and/or aluminium silicates, for example, sepiolite fibres, fibres of palygorskite (also known as attapulgite) or mixtures thereof. The inorganic fibres of sepiolite are particularly preferred.

According to a preferred embodiment, said inorganic fibres are present in the elastomeric material in an amount from 1 phr to 20 phr, preferably from 3 phr to 15 phr.

According to a preferred embodiment, said at least one elastomeric material layer has a thickness under 2 mm, preferably between 0.2 mm and 1.5 mm.

According to a preferred embodiment, said at least one elastomeric material layer is placed between said tread band and said belt structure.

According to a preferred embodiment, said elastomeric material further comprises (c) a carbon black reinforcing filler.

According to a preferred embodiment, said elastomeric material further comprises (d) a silane coupling agent.

For the purposes of the present description and of the claims given hereafter, the term "phr" denotes the parts by weight of a specified component of the elastomeric material per 100 parts by weight of the diene elastomeric polymer.

Advantageously, the inorganic fibres are treated with a compatibilizing agent.

According to a preferred embodiment, said compatibilizing agent can be selected, for example, from quaternary ammonium or phosphonium salts having the general formula (I)

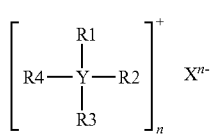

in which:

Y represents N or P;

R1, R2, R3 and R4, which may be identical or different, represent a linear or branched C1-C20 alkyl or hydroxyalkyl group; a linear or branched C1-C20 alkenyl or hydroxyalkenyl group; a group —R5-SH or —R5-NH$_2$, in which R5 represents a linear or branched C1-C20 alkylene group; a C6-C18 aryl group; a C7-C20 aralkyl or alkaryl group; a C5-C18 cycloalkyl group, said cycloalkyl group optionally containing heteroatoms such as oxygen, nitrogen or sulphur;

$X^{n-}$ represents an anion such as the chlorine ion, sulphate ion or phosphate ion;

n represents 1, 2 or 3.

The treatment of the inorganic fibres with the compatibilizing agent is carried out to obtain increased dispersion of the silicates in the elastomer matrix. The silicate, typically hydrophilic, is made organophilic by exchange of alkaline cations for example with relatively long chains, of quaternary alkyl ammonium cations, changing the surface polarity of the silicate. Further details are described, for example, in patents U.S. Pat. No. 4,136,103; U.S. Pat. No. 5,747,560 or U.S. Pat. No. 5,952,093. An example of inorganic fibres, which can be used according to the present invention and is commercially available, is the product known by the name Pangel B5, supplied by Tolsa Group (http://www.tolsa.com/).

According to a preferred embodiment, the diene elastomeric polymer (a) that can be used in the present invention can be selected from those commonly used in sulphur-curable elastomeric materials, which are particularly suitable for making tyres, i.e. from elastomeric polymers or copolymers with an unsaturated chain having a glass transition temperature (Tg) generally below 20° C., preferably in the range from 0° C. to −110° C. These polymers or copolymers can be of natural origin or can be obtained by solution polymerization, emulsion polymerization or gas-phase polymerization of one or more conjugated diolefins, optionally mixed with at least one comonomer selected from monovinylarenes and/or polar comonomers in an amount not greater than 60 wt. %.

The conjugated diolefins generally contain from 4 to 12, preferably from 4 to 8 carbon atoms and can be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-Butadiene and isoprene are particularly preferred.

Monovinylarenes, which can optionally be used as comonomers, generally contain from 8 to 20, preferably from 8 to 12 carbon atoms and can be selected, for example, from: styrene; 1-vinylnaphthalene; 2-vinylnaphthalene; various alkyl, cycloalkyl, aryl, alkaryl or aralkyl derivatives of styrene, for example α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl) styrene, or mixtures thereof. Styrene is particularly preferred.

Polar comonomers that can optionally be used can be selected for example from: vinyl pyridine, vinyl quinoline, esters of acrylic acid and of alkylacrylic acid, nitriles, or mixtures thereof, for example methyl acrylate, ethyl acrylate, methyl methacrylate, ethyl methacrylate, acrylonitrile or mixtures thereof.

Preferably, the diene elastomeric polymer (a) that can be used in the present invention can be selected, for example, from: cis-1,4-polyisoprene (natural or synthetic, preferably natural rubber), 3,4-polyisoprene, polybutadiene (in particular polybutadiene with high 1,4-cis content), optionally halogenated isoprene/isobutene copolymers; 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

According to a preferred embodiment, said elastomeric material comprises at least 10 wt. %, preferably between 20 wt. % and 100 wt. % of natural rubber, relative to the total weight of said at least one diene elastomeric polymer (a).

The aforementioned elastomeric material can optionally comprise at least one elastomeric polymer of one or more monoolefins with an olefinic comonomer or derivatives thereof (a'). The monoolefins can be selected from: ethylene and α-olefins generally containing from 3 to 12 carbon atoms, for example propylene, 1-butene, 1-pentene, 1-hexene, 1-octene or mixtures thereof. The following are preferred: copolymers of ethylene and an α-olefin, optionally a diene; homopolymers of isobutene or copolymers thereof with a small amount of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinyl norbornene or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

It is also possible to use a diene elastomeric polymer (a) or an elastomeric polymer (a') functionalized by reaction with suitable terminating agents or coupling agents. In particular, the diene elastomeric polymers obtained by anionic polymerization in the presence of an organometallic initiator (in particular an organolithium initiator) can be functionalized by reacting the residual organometallic groups derived from the initiator with suitable terminating agents or coupling agents, for example imines, carbodiimides, alkyl tin halides, substituted benzophenones, alkoxysilanes or aryloxysilanes.

As described above, said elastomeric material preferably further comprises at least one carbon black reinforcing filler (c).

According to a preferred embodiment, the carbon black reinforcing filler (c) that can be used in the present invention can be selected from those having a surface area not less than 20 m$^2$/g (determined from STSA—statistical thickness surface area according to ISO 18852:2005).

According to a preferred embodiment, said carbon black reinforcing filler (c) is present in the elastomeric material in an amount between 0.1 phr and 120 phr, preferably between 20 phr and 90 phr.

As described above, said elastomeric material preferably further comprises at least one silane coupling agent (d).

According to a preferred embodiment, the silane coupling agent (d) that can be used in the present invention can be selected from those having at least one hydrolysable silane group, which can be identified, for example, by the following general formula (II):

$$(R)_3Si—CnH_{2n}—X \qquad (II)$$

where the groups R, which may be identical or different, are selected from: alkyl, alkoxy or aryloxy groups or halogen atoms, provided that at least one of the groups R is an alkoxy or aryloxy group; n is an integer between 1 and 6 inclusive; X is a group selected from: nitroso, mercapto, amino, epoxide, vinyl, imide, chlorine, —(S)$_m$CnH$_{2n}$—Si—(R)$_3$ or —S—COR, where m and n are integers between 1 and 6 inclusive and the groups R are defined as above.

Among the silane coupling agents, those particularly preferred are bis(3-triethoxysilylpropyl) tetrasulphide and bis(3-triethoxysilylpropyl) disulphide. Said coupling agents can be used as such or as a suitable mixture with an inert filler (for example carbon black) to facilitate their incorporation in the elastomeric material.

According to a preferred embodiment, said silane coupling agent (d) is present in the elastomeric material in an amount between 0.01 phr and 10 phr, preferably between 0.5 phr and 5 phr.

At least one additional reinforcing filler can advantageously be added to the aforementioned elastomeric material, in an amount generally between 0.1 phr and 120 phr, preferably between 20 phr and 90 phr.

The reinforcing filler can be selected from those commonly used for crosslinked products, in particular for tyres, for example silica, alumina, aluminosilicates, calcium carbonate, kaolin or mixtures thereof.

The silica that can be used in the present invention can generally be a pyrogenic silica or preferably a precipitated silica, with a BET surface area (measured according to standard ISO 5794/1) between 50 m$^2$/g and 500 m$^2$/g, preferably between 70 m$^2$/g and 200 m$^2$/g.

The elastomeric material can advantageously incorporate a silane coupling agent (d) that is able to interact with the silica optionally present as reinforcing filler and/or the silicates and bind them to the diene elastomeric polymer during vulcanization. Examples of silane coupling agents (d) that can be used were described above.

Preferably, the elastomeric material of the tread band comprises at least one diene elastomeric polymer and at least one reinforcing filler selected from those commonly used in sulphur-curable elastomeric materials, which are particularly suitable for making tyres, for example those described above with reference to said at least one elastomeric material layer.

The aforementioned elastomeric materials, both for said at least one elastomeric material layer and for the tread band, can be vulcanized according to the known techniques, in particular with sulphur-based vulcanizing systems commonly used for diene elastomeric polymers. For this purpose, after one or more stages of thermomechanical processing, a sulphur-based vulcanizing agent is incorporated, together with vulcanization accelerators, in the materials. In the final treatment step, the temperature is generally kept below 120° C. and preferably below 100° C., in order to avoid any undesirable scorching.

The vulcanizing agent used most advantageously is sulphur, or sulphur-containing molecules (sulphur donors), with accelerators and activators known by persons skilled in the art.

The activators that are particularly effective are zinc compounds and in particular ZnO, ZnCO$_3$, zinc salts of saturated or unsaturated fatty acids containing from 8 to 18 carbon atoms, for example zinc stearate, which are preferably formed in situ in the elastomeric material from ZnO and fatty acid, such as BiO, PbO, Pb$_3$O$_4$, PbO$_2$, or mixtures thereof.

The accelerators that are commonly used can be selected from: dithiocarbamates, guanidine, thiourea, thiazoles, sulphenamides, thiurams, amines, xanthates or mixtures thereof.

Said elastomeric materials can comprise other commonly used additives, selected on the basis of the specific application for which the composition is intended. For example, the following can be added to said materials: antioxidants, anti-ageing agents, plasticizers, adhesives, anti-ozone agents, modifying resins, or mixtures thereof.

In particular, for further improvement of processability, a plasticizer can be added to said elastomeric material, generally selected from mineral oils, vegetable oils, synthetic oils or mixtures thereof, for example aromatic oil, naphthenic oil, phthalates, soya oil or mixtures thereof. The amount of plasticizer is generally between 0 phr and 70 phr, preferably between 5 phr and 30 phr.

The aforementioned elastomeric materials can be prepared by mixing together the polymeric components with the reinforcing filler and with the other additives optionally present according to the techniques known by a person skilled in the art. Mixing can be carried out, for example, using an open mixer of the "open-mill" type or an internal mixer of the type with tangential rotors (Banbury) or with intermeshing rotors (Intermix), or in continuous mixers of the Ko-Kneader type (Buss) or of the twin-screw or multi-screw type.

BRIEF DESCRIPTION OF THE DRAWINGS

The following description refers to the appended drawings, which are supplied purely for purposes of illustration and therefore are not limiting, in which.

DETAILED DESCRIPTION OF THE INVENTION

Figure 1:
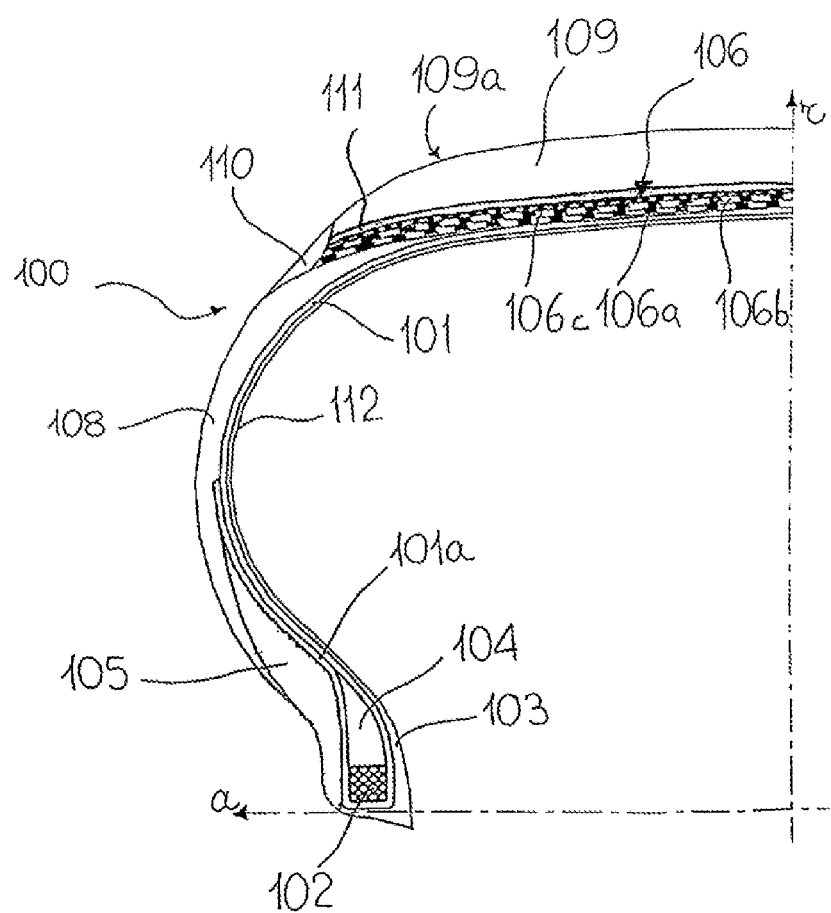
FIG. 1 shows, in radial half section, a tyre for vehicle wheels.

"a" indicates an axial direction and "r" indicates a radial direction. For simplicity, FIG. 1 shows only one portion of the tyre, the remainder that is not shown being identical and arranged symmetrically with respect to the radial direction "r".

The tyre 100 comprises at least one carcass structure, comprising at least one carcass layer 101 having respectively opposite terminal edges engaged in respective annular anchoring structures 102, optionally associated with bead filling 104, integrated in the bead structures 103.

The carcass structure is usually of the radial type, i.e. the reinforcing elements of at least one carcass layer 101 are located in planes comprising the rotation axis of the tyre and substantially perpendicular to the equatorial plane of the tyre. Said reinforcing elements generally consist of textile cords, for example rayon, nylon, polyester (for example polyethylene naphthalate (PEN)). Each bead structure is associated with the carcass structure by folding back the opposite lateral edges of at least one carcass layer 101 around the bead structure in order to form so-called carcass turn-up 101a as depicted in FIG. 1.

In one embodiment, coupling between the carcass structure and bead structure can be provided by a second carcass layer (not shown in FIG. 1) applied in an axially outer position with respect to the first carcass layer.

An anti-abrasion strip 105 is normally arranged in an axially outer position with respect to the carcass turn-up (101a).

The carcass structure is associated with a belt structure 106 comprising one or more belt layers 106a, 106b arranged radially overlapping with respect to one other and with respect to the carcass layer, having reinforcing cords, typically metallic. These reinforcing cords can have crossed orientation with respect to a direction of circumferential development of the tyre 100. "Circumferential" direction means a direction generally following the direction of rotation of the tyre.

In a radially outermost position with respect to the belt layers 106a, 106b, at least one reinforcing layer at zero degrees 106c, commonly known as "0° belt", can be applied, which generally incorporates a plurality of reinforcing cords, typically textile cords, oriented in a substantially circumferential direction, thus forming an angle of a few degrees (for example an angle between about 0° and 6°) relative to the equatorial plane of the tyre, and coated with an elastomeric material.

In a radially outer position with respect to the belt structure 106, a tread band 109 of elastomer compound is applied, as well as other semifinished products constituting the tyre 1.

Moreover, on the lateral surfaces of the carcass structure, each extending from one of the lateral edges of the tread 109 up to the respective bead structure 103, respective sidewalls 108 of elastomer compound are applied in an axially outer position.

In a radially outer position, the tread band 109 has a rolling surface 109a intended to come into contact with the ground. Circumferential grooves, which are connected by transverse grooves (not shown in FIG. 1) to define a plurality of blocks of various shapes and dimensions distributed on the rolling surface 109a, are generally made in this surface 109a, which for simplicity is shown smooth in FIG. 1.

An underlayer 111 is arranged between the belt structure 106 and the tread band 109. This underlayer 111 is made from an elastomeric material reinforced with inorganic fibres of magnesium and/or aluminium silicates, said fibres having nanometric dimensions.

As shown in FIG. 1, the underlayer 111 can have a uniform thickness.

As an alternative, the underlayer 111 can have a thickness that varies in the axial direction. For example, the underlayer can have a greater thickness near its axially outer edges with respect to the central (rim) zone.

In FIG. 1, said underlayer 111 extends over a surface substantially corresponding to the development surface of said belt structure 106. In one embodiment, said underlayer 111 only extends over a portion of the development of said belt structure 106, for example on opposite lateral portions of said belt structure 106 (not shown in FIG. 1).

In one embodiment said underlayer has a thickness that varies in the axial direction so that it is thicker corresponding to the blocks defined in the tread band.

A strip consisting of elastomeric material 110, commonly known as "mini-sidewall", can optionally be present in the connecting zone between the sidewalls 108 and the tread band 109, said mini-sidewall generally being obtained by co-extrusion with the tread band 109 and improving the mechanical interaction between the tread band 109 and the sidewalls 108. Preferably the end portion of the sidewall 108 directly covers the lateral edge of the tread band 109.

In the case of tubeless tyres, a layer of rubber 112, generally called "liner", which provides the necessary impermeability to the air used for inflating the tyre, can also be provided in a radially inner position with respect to the carcass layer 101.

Building of the tyre 100 as described above can be carried out by assembling the respective semifinished products on a building drum, not shown, using at least one assembling device.

At least some of the components intended to form the carcass structure of the tyre can be constructed and/or assembled on the building drum. More particularly, the building drum can receive first any liner, and then the carcass structure. Next, devices that are not shown engage one of the annular anchoring structures coaxially around each of the ends, position an outer sleeve comprising the belt structure and the tread band in position coaxially centred around the cylindrical carcass sleeve and form the carcass sleeve according to a toroidal configuration by radial expansion of the carcass structure, so that it is applied against a radially internal surface of the outer sleeve.

Following building of the raw tyre, an operation of moulding and final vulcanization is carried out for structural stabilization of the tyre by crosslinking the elastomer compound as well as impressing a desired tread pattern on the tread band and impressing any distinctive graphical symbols to correspond to the sidewalls.

According to a preferred embodiment, said underlayer is formed by a plurality of windings of an elongated continuous element.

Figure 2:
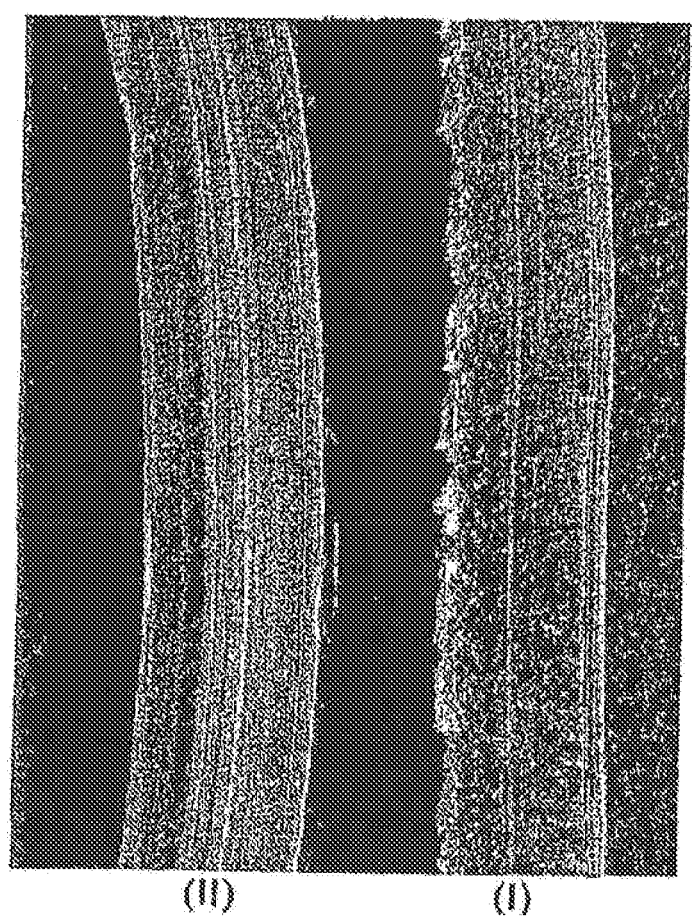
FIG. 2 is a photograph illustrating a comparative test between test specimens of elastomer compound.

FIG. 2 is a photograph illustrating the difference in appearance of two test specimens obtained with elastomeric materials using a laboratory extruder equipped with Garvey extrusion dies according to ASTM technical standard D2230.

Figure 3:
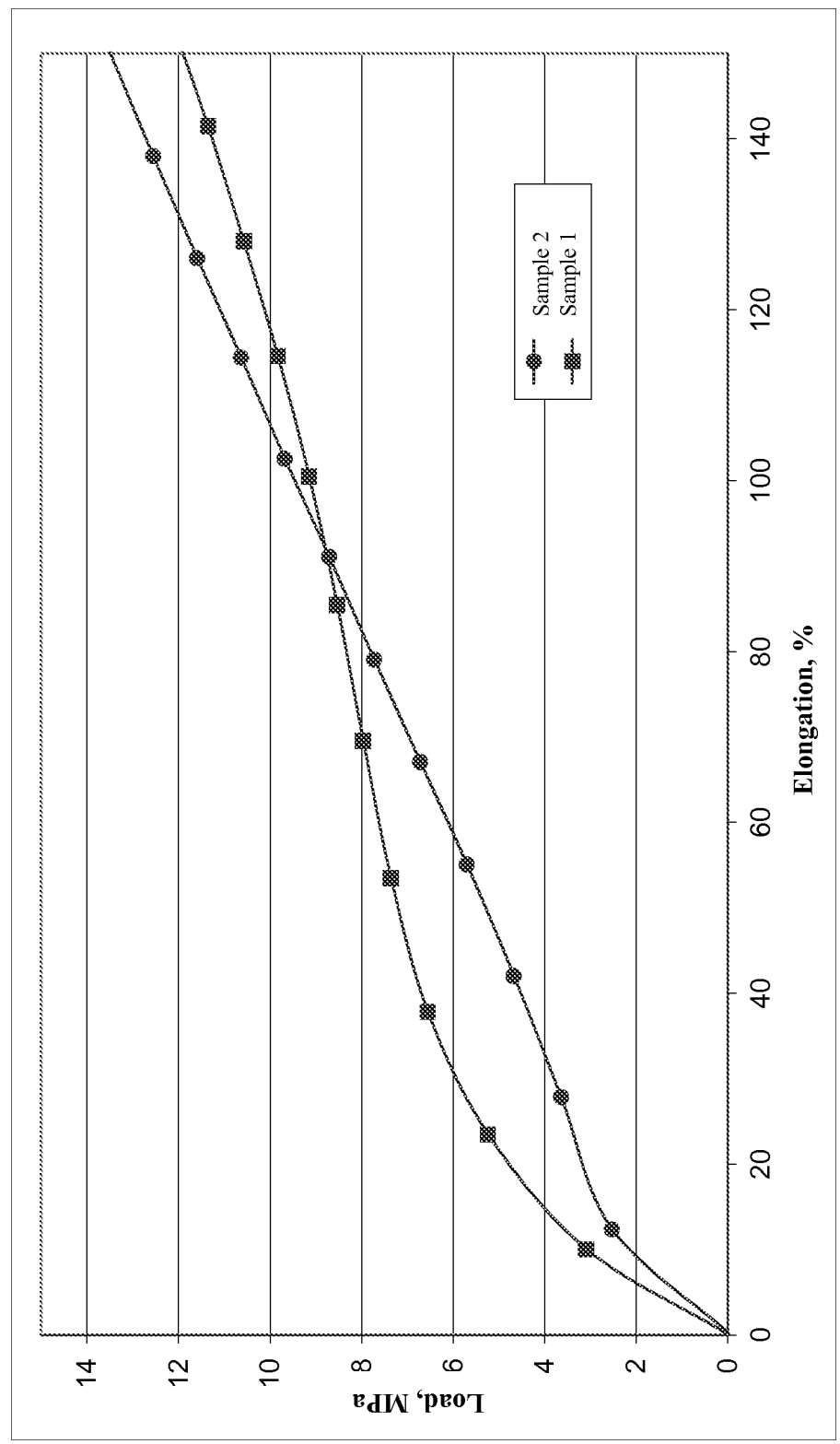
FIG. 3 shows a stress/strain diagram comparing two samples of vulcanized elastomer compound.

FIG. 3 illustrates the substantially linear shape of the stress/strain curve of a vulcanized elastomer compound comprising sepiolite as reinforcing filler compared to a non-linear curve relating to a vulcanized elastomer compound reinforced with Kevlar® fibres.

The present invention will be further illustrated below by means of a number of examples of preparation, which are supplied purely for purposes of illustration and without any limitation of this invention.

EXAMPLE 1

UHP Underlayers

The elastomeric materials shown in Table 1 were prepared as follows (the amounts of the various components are given in phr).

All the components, except sulphur, accelerator (TBBS), retarder (PVI) and HMMM, were mixed in an internal mixer (model Pomini PL 1.6) for about 5 minutes (1st step). As soon as the temperature reached 145±5° C., the elastomeric material was discharged. The sulphur, accelerator (TBBS), retarder (PVI) and HMMM were added and mixing was carried out in an open roller mixer (2nd step).

TABLE 1

| SAMPLE | 1 (*) | 2 |
|---|---|---|
| 1st STEP | | |
| NR | 100 (**) | 100 |
| CB | 45.00 | 45.00 |
| Silica | 12.00 | 12.00 |
| Kevlar | 2 (**) | — |
| Pangel B5 | — | 6.00 |
| Silane | 2.00 | 2.00 |
| Adhesive resin | 3.00 | 3.00 |
| Zinc oxide | 3.30 | 3.30 |
| Stearic acid | 2.00 | 2.00 |
| Mineral oil | 3.00 | 3.00 |
| TMQ | 1.00 | 1.00 |
| 6PPD | 2.00 | 2.00 |
| Resorcinol | 2.50 | 2.50 |
| 2nd STEP | | |
| HMMM | 4.00 | 4.00 |
| PVI | 0.30 | 0.30 |
| TBBS | 1.50 | 1.50 |
| Curing agent | 3.00 | 3.00 |

(*): comparison
(**): The Kevlar was introduced as Kevlar pulp, consisting of 2 phr of Kevlar fibres and 6.7 phr of NR, for a total of 100 phr of NR in the compound
NR: natural rubber, SMR-GP, Lee Rubber;
CB: carbon black N375, Cabot;
Silica: Silica Ultrasil 7000, Ege Kymia;
Kevlar: Kevlar pulp latex MB 23%, DuPont comprising fibrillated aramid fibres having a configuration with a main stem of length between 0.5 mm and 1.6 mm, typically length of about 0.9 mm and a diameter of about 16 µm;
Pangel B5: sepiolite modified with quaternary ammonium salt at 20 wt. %, Tolsa Group fibres with length between 0.2 µm and 2 µm and diameter between 5 nm and 30 nm;
Silane: 50% bis(3-triethoxysilylpropyl) tetrasulphide to 50% carbon black, X50S, Degussa-Hüls;
Adhesive resin: Quintone A100, Zeon Corporation;
Mineral oil: MES (Mild Extraction Solvate), ENI Spa;
TMQ: 2,2,4-trimethyl-1,2-dihydroquinoline, Kemai
6PPID: N-(1,3-dimethylbutyl)-N'-phenyl-p-phenylene diamine, Chemtura Corporation;
Resorcinol: resorcinol (80%) dispersed in polymer binder, Rhenogran Resorcinol-80/GE 1323, Rhein Chemie;
HMMM: hexamethoxymethylmelamine (65%) on inert support, Cyrez 964 P.C., Cytec;
TBBS: N-tert-butyl-2-benzothiazylsulphenamide, Vulkacit ® NZ/EGC, Lanxess;
PVI: cyclohexyl-thiophthalimide, Santogard PVI, Flexsys
Curing agent: Sulphur, Redball Superfine, International Sulphur Inc.

The Mooney ML viscosity (1+4) at 100° C. was measured, according to standard ISO 289-1:2005, on uncured materials, obtained as described above. The results are given in Table 2.

The fluidity was measured with the Rubber Capillary Rheometer II-Goettfert, injecting a predetermined amount of elastomer compound. The compound is preheated at 90° C. for two minutes and then is injected in the capillary at 90° C. and 40 bar of pressure, measuring the volume (in $cm^3$) of compound that passed through the capillary during the test and the volume in unit time ($cm^3$/min).

The static mechanical properties according to standard ISO 37:2005 were measured at different elongations (50%, 100%, 300%) on samples of the aforementioned elastomeric materials, vulcanized at 170° C. for 10 minutes. The tensile tests were carried out on dumbbell test specimens.

The results obtained are given in Table 2. The dynamic mechanical properties were found using a Monsanto R.P.A. 2000 rheometer according to the following method: cylindrical test specimens with weights in the range from 4.5 g to 5.5 g were obtained by punching from the crosslinked elastomeric composition of samples 1 and 2 (vulcanized at 170° C. for 10 min) and their dynamic storage modulus in shear (G') was measured at 70° C., frequency 10 Hz, strain 0.5% and 10%. The Payne effect was evaluated from the difference between the moduli (G') at the two aforementioned percentage strains.

Table 2 also shows the dynamic mechanical properties measured using an Instron dynamic tester in tension-compression mode according to the following methods. A test piece of crosslinked material having a cylindrical shape (length=25 mm; diameter=12 mm), preloaded in compression up to a longitudinal strain of 10% relative to the initial length and held at the specified temperature (23° C. or 70° C.) throughout the test, was subjected to a dynamic sinusoidal stress having an amplitude of +3.3% relative to the length under pre-loading, with a frequency of 10 Hz. The dynamic mechanical properties are expressed in terms of values of dynamic storage modulus (E') and tan delta (loss factor). The value tan delta was calculated as the ratio of the dynamic viscous modulus (E") to the dynamic elastic modulus (E'), both being determined with the aforementioned dynamic measurements.

The hardness in degrees IRHD (at 10° C., 23° C., and 100° C.) was measured according to standard ISO 48:2007, on samples of the aforementioned elastomeric materials, vulcanized at 170° C. for 10 minutes.

The mechanical properties were measured both in the direction of calendering and in the direction perpendicular to this.

The anisotropy was determined on the basis of the ratio of the static loads at equal elongation (50%) measured in two directions, parallel and perpendicular to the direction of calendering. The two compounds both display anisotropy (Ca0.5 parallel/Ca0.5 perpendicular >1.2).

The linearity was instead determined on the basis of the ratio of the static loads at two different elongations, 50% and 100% of strain, measured in the direction parallel to the direction of calendering. The ratio thus describes the course of the curve in its initial section.

TABLE 2

| SAMPLE | 1 (*) | 2 |
|---|---|---|
| Viscosity ML (1 + 4) | 75.6 | 74.9 |
| Volume of fluidity ($cm^3$) | 614.7 | 1162.1 |
| Volume in unit time ($cm^3$/min) | 10.2 | 19.4 |
| STATIC MECHANICAL PROPERTIES DIRECTION OF CALENDERING | | |
| Modulus 50% (MPa) | 7.3 | 5.1 |
| Modulus 100% (MPa) | 9.3 | 9.1 |
| DIRECTION PERPENDICULAR TO CALENDERING | | |
| Modulus 50% (MPa) | 4.2 | 3.8 |
| Modulus 100% (MPa) | 7.0 | 6.5 |
| ANISOTROPY | | |
| Ratio of 50% Modulus in the two directions | 1.7 | 1.4 |

TABLE 2-continued

| SAMPLE | 1 (*) | 2 |
|---|---|---|
| LINEARITY | | |
| Ratio Modulus 100%/Modulus 50% | 1.3 | 1.8 |
| HARDNESS | | |
| IRHD (23° C.) | 90.0 | 93.0 |
| DYNAMIC MECHANICAL PROPERTIES | | |
| E' (23° C.) (MPa) | 23.4 | 23.70 |
| tan delta (23° C.) | 0.165 | 0.192 |
| tan delta (70° C.) | 0.123 | 0.147 |
| G' 0.5% | 8.14 | 13.14 |
| G' 10% | 3.00 | 3.79 |
| Payne ΔG'(0.5%-10%) | 5.14 | 9.35 |

The data in Table 2 show that compared with a slight improvement in viscosity, the fluidity of sample 2 reinforced with sepiolite fibres is notably greater, to the benefit of the processability of the compound and the productivity of the industrial process.

Sample 2 displays some deterioration of the static mechanical properties, especially in the value of the moduli in the direction of calendering, but a more linear behaviour.

The hysteresis (measured with tan delta) of sample 2 was found to be higher than that of the comparative sample, both at low and at high temperatures, and a significant increase in the Payne effect was observed, thus demonstrating some dependence of the dynamic shear modulus on the strain amplitude for this material.

Referring to FIG. 3, surprising linearity is observed in the stress/strain curve of the elastomeric material of sample 2, indicated by a ratio between the moduli at different strain (respectively 50% and 100%) greater than 1.5, while the elastomeric material of sample 1 has a stress/strain curve that increases non-linearly.

Referring to test specimens obtained with the elastomeric materials 1 and 2, FIG. 2 illustrates the difference in their appearance. The test specimens were obtained using a laboratory extruder equipped with Garvey extrusion dies according to ASTM technical standard D2230.

FIG. 2 clearly shows the greater surface roughness of specimen (I) obtained from the comparative elastomeric material 1 and the more jagged edge of said specimen. Specimen (II) obtained from the elastomeric material 2 shows a definite improvement of both characteristics.

The applicant found that the better processability of the elastomeric material guarantees lower surface roughness of the semifinished product comprising said elastomeric material, which is reflected in better reproducibility of the underlayer made with this semifinished product, with consequent reduction of waste, increase in productivity and greater constancy and uniformity of tyre performance during use.

EXAMPLE 2

Tyres were prepared according to FIG. 1, containing an elastomeric material layer according to sample 1 (comparison) and according to sample 2 (invention).

The tyres, of size 295/30 R20, were then mounted on a Porsche 9X1 C2 and tested on a racing circuit. The results obtained are shown in Table 3.

For evaluating tyre behaviour, the tester simulated some typical manoeuvres (for example, lane changing, going into a bend, coming out of a bend). Then the tester assessed tyre behaviour and awarded a score in relation to tyre performance during said manoeuvre.

The tests were conducted in extreme driving conditions that describe the tyre's behaviour at the limit of grip. Then the tester carried out manoeuvres that an average driver might be forced to execute in unexpected and dangerous circumstances: sudden swerving at high speed, sudden lane changing to avoid obstacles, sudden braking and the like.

The tester evaluated various aspects of behaviour, for example the force on the steering wheel when it is turned sharply; the quickness of insertion, i.e. the behaviour of the tyre when going into a bend taken at the maximum speed; balance, i.e. the degree of oversteer or understeer of the vehicle: the yield, i.e. the tyre's capacity to absorb a rapid transfer of load owing to a sudden lane change without excessive deformation and therefore without compromising the stability and controllability of the vehicle; release on a bend, i.e. the tyre's capacity to attenuate the effects of instability due to sudden release of the accelerator during a bend taken at the maximum speed; controllability, i.e. the tyre's capacity to maintain and/or return the vehicle to its path after loss of grip.

Table 3 summarizes the tester's score sheet for the controllability of the tyres. The results of these tests are expressed by means of an assessment scale that represents the subjective opinion expressed by the tester using a points system. The values reproduced in the following table represent a mean value from those obtained in several test sessions (5-6 tests, for example) and supplied by several testers. It should be noted that the scale of values goes from a minimum of 4 to a maximum of 8.

TABLE 3

| | 1 (*) | | 2 | |
|---|---|---|---|---|
| TYRE SAMPLE | Start | End | Start | End |
| STEERING TESTS | | | | |
| Response | 7.5 | 7.5 | 7.5 | 7.5 |
| Angle | 7.5 | 7.5 | 7.5 | 7.5 |
| Accuracy | 7.5 | 7.5 | 7.5 | 7.5 |
| Information | 7.5 | 7.5 | 7.5 | 7.5 |
| Centre of gravity | 7.5 | 7.5 | 7.5 | 7.5 |
| Force | 7.5 | 7.5 | 7.5 | 7.5 |
| DIRECTIONAL CONTROL | | | | |
| Rear steering | 7.0 | 6.0 | 7.5 | 7.0 |
| Rear oscillation | 7.0 | 6.0 | 7.5 | 7.5 |
| Understeer | 7.5 | 7.5 | 7.5 | 7.5 |
| Oversteer | 7.0 | 6.5 | 7.5 | 7.0 |
| Transfer of load | 7.0 | 6.0 | 7.5 | 7.5 |
| Release | 7.0 | 6.0 | 7.5 | 7.0 |
| STABILITY | | | | |
| Linearty of braking | 7.0 | 7.0 | 7.5 | 7.5 |
| Acceleration on a bend | 7.0 | 6.0 | 7.5 | 7.5 |

The assessments relating to the STEERING TESTS depend essentially on the behaviour of the front tyres, therefore the aspects that are most significant for assessing the comparative performance of the tyres were those in the sections DIRECTIONAL CONTROL and STABILITY on the score sheet. The set of tyres according to the invention made with an underlayer reinforced with sepiolite showed a higher stability of performance compared to the set of tyres made with the underlayer reinforced with Kevlar.

Moreover, the tyres according to the present invention obtained, on average, significantly better results with respect to maintenance of performance throughout the test. The differences between the two sets in fact became more pronounced after a few km of driving, thus the assessments "start" and "end" given in the table were made at the beginning of the test and at the end of the test respectively, when the tester perceived the first deterioration of tyre performance.

These changes were perceived respectively after a distance travelled of 5 km in the tests with the comparison tyres (Sample 1) and after a distance travelled of 12 km for the tyres made according to the invention (Sample 2).

The results given in Table 3 clearly demonstrate that the tyre according to the present invention (Sample 2), despite being obtained with an elastomeric material with a high value of the Payne effect, had better behaviour than the comparison tyre (Sample 1), and in particular shows improved performance for the aspect of oversteer and for all the aspects indicative of rear stability (oscillation, transfer, release), and more generally of driving stability of the vehicle (linearity of braking, acceleration on a bend).

This is all the more surprising bearing in mind that the applicant had found that the addition of inorganic fibres of nanometric dimensions caused a notable increase in the Payne effect (dependence of the dynamic modulus on the strain amplitude) in the elastomeric material, such an increase not generally being regarded as advantageous since typically it is correlated with a reduction of tyre performance with respect to vehicle stability.

The Payne effect is observed in dynamic mechanical testing and is manifested as dependence of the dynamic shear modulus as the dynamic strain is increased. At stress amplitudes above 0.1%, the storage modulus decreases rapidly with increase in amplitude. At sufficiently large stress amplitudes (for example approximately 15%), the storage modulus approaches a lower limit. In the region of the stress/strain diagram in which the storage modulus decreases, the viscous modulus has a maximum, resulting in a maximum loss factor (tan delta).

In this connection, although the Payne effect discouraged further experiments on the elastomeric material, the applicant, purely on the basis of the findings of improved tensile properties, better processability of the elastomer compound comprising inorganic fibres of magnesium and/or aluminium silicates having nanometric dimensions and the linear shape of the stress/strain curve of the vulcanized material, decided to continue, obtaining the aforementioned result, which is surprising in terms of tyre stability and performance.

EXAMPLE 3

UHP Underlayers

The elastomeric materials shown in Table 4, with various percentages of sepiolite reinforcement relative to the elastomeric material 2 of example 1, were prepared as follows (the amounts of the various components are given in phr).

All the components, except sulphur, accelerator (TBBS), retarder (PVI) and HMMM, were mixed in an internal mixer (model Pomini PL 1.6) for about 5 minutes (1st step). As soon as the temperature reached 145±5° C., the elastomeric material was discharged. The sulphur, accelerator (TBBS), retarder (PVI) and HMMM were added and mixing was carried out in an open roller mixer (2nd step).

TABLE 4

| SAMPLE | 3 | 4 |
|---|---|---|
| 1st STEP | | |
| NR | 100 | 100 |
| CB | 45.00 | 45.00 |
| Silica | 12.00 | 12.00 |
| Pangel B5 | 4.50 | 9.00 |
| Silane | 2.00 | 2.00 |
| Adhesive resin | 3.00 | 3.00 |
| Zinc oxide | 3.30 | 3.30 |
| Stearic acid | 2.00 | 2.00 |
| Mineral oil | 3.00 | 3.00 |
| TMQ | 1.00 | 1.00 |
| 6PPD | 2.00 | 2.00 |
| Resorcinol | 2.50 | 2.50 |
| 2nd STEP | | |
| HMMM | 4.00 | 4.00 |
| PVI | 0.30 | 0.30 |
| TBBS | 1.50 | 1.50 |
| Curing agent | 3.00 | 3.00 |

(*): comparison
NR: natural rubber, SMR-GP, Lee Rubber;
CB: carbon black N375, Cabot;
Silica: Silica Ultrasil 7000, Ege Kymia;
Pangel B5: sepiolite modified with quaternary ammonium salt at 20 wt. %, Tolsa Group; fibres with length between 0.2 μm and 2 μm and diameter between 5 nm and 30 nm;
Silane: 50% bis(3-triethoxysilylpropyl) tetrasulphide to 50% carbon black, X50S, Degussa-Hüls;
Adhesive resin: Quintone A100, Zeon Corporation;
Mineral oil: MES (Mild Extraction Solvate), ENI Spa;
TMQ: 2,2,4-trimethyl-1,2-dihydroquinoline, Kemai;
6PPD: N-(1,3-dimethylbutyl)-N'-phenyl-p-phenylene diamine, Chemtura Corporation;
Resorcinol: resorcinol (80%) dispersed in polymer binder, Rhenogran Resorcinol-80/GE 1323, Rhein Chemie;
HMMM: hexamethoxymethylmelamine (65%) on inert support, Cyrez 964 P.C., Cytec;
TBBS: N-tert-butyl-2-benzothiazylsulphenamide, Vulkacit ® NZ/EGC, Lanxess;
PVI: cyclohexyl-thiophthalimide, Santogard PVI, Flexsys
Curing agent: sulphur, Redball Superfine, International Sulphur Inc.

Table 5 shows the viscosity, hardness and static and dynamic mechanical properties measured with the methods and the standards described in example 1 (the tensile tests were performed with rings).

TABLE 5

| SAMPLE | 3 | 4 |
|---|---|---|
| Viscosity ML (1 + 4) | 74 | 80 |
| STATIC MECHANICAL PROPERTIES | | |
| Modulus 50% (MPa) | 3.3 | 3.9 |
| Modulus 100% (MPa) | 5.6 | 6.4 |
| Stress at break (MPa) | 18.7 | 16.1 |
| Elongation at break (%) | 323.6 | 274.3 |
| HARDNESS | | |
| IRHD (23° C.) | 88.7 | 94.5 |
| IRHD (70° C.) | 80.6 | 86.4 |
| DYNAMIC MECHANICAL PROPERTIES | | |
| E' (23° C.) (MPa) | 22.8 | 24.8 |
| E' (70° C.) (MPa | 16.2 | 19.5 |
| tan delta (23° C.) | 0.185 | 0.200 |
| tan delta (70° C.) | 0.143 | 0.158 |

The results in Table 5 confirmed the results of example 1 and demonstrated some proportionality between the amounts of sepiolite added and the reinforcement effect obtainable in relation to the static modulus, hardness and dynamic mechanical properties (the latter being particularly relevant to tyre performance in conditions of high operating speed and/or extreme driving conditions).

The dynamic mechanical properties of sample 3 (with 4.5 phr of sepiolite) were already found to be substantially good.

In particular, quite good dynamic reinforcement was obtained without loss of breaking strength. In the case of sample 4 (with 9.0 phr of sepiolite) the dynamic mechanical properties are notably improved, especially when hot, with the static mechanical properties substantially unchanged, even though there was an undesirable increase in the values of hysteresis (tan delta).

EXAMPLE 4

HP Underlayers

The elastomeric materials shown in Table 6 were prepared as follows (the amounts of the various components are given in phr).

All the components, except sulphur, accelerator (TBBS), retarder (PVI) and HMMM, were mixed in an internal mixer (model Pomini PL 1.6) for about 5 minutes (1st step). As soon as the temperature reached 145±5° C., the elastomeric material was discharged. The sulphur, accelerator (TBBS), retarder (PVI) and HMMM were added and mixing was carried out in an open roller mixer (2nd step).

TABLE 6

| SAMPLE | 5(*) | 6 |
|---|---|---|
| 1st STEP | | |
| NR | 100 | 100 |
| CB | 63 | 56 |
| Pangel B5 | — | 9 |
| Silane | 1.00 | 1.00 |
| Adhesive resin | 3.00 | 3.00 |
| Zinc oxide | 6.50 | 6.50 |
| Stearic acid | 0.80 | 0.80 |
| 6PPD | 2.00 | 2.00 |
| Resorcinol | 1.88 | 1.88 |
| 2nd STEP | | |
| HMMM | 3.50 | 3.50 |
| PVI | 0.15 | 0.15 |
| TBBS | 1.25 | 1.25 |
| Curing agent | 3.35 | 3.35 |

(*)comparison
NR: natural rubber, SMR-GP, Lee Rubber;
CB: carbon black N326, Cabot;
Pangel B5: sepiolite modified with quaternary ammonium salt at 20 wt. %, Tolsa Group 9 phr of modified sepiolite, equivalent to approx. 7 phr sepiolite; fibres with length between 0.2 μm and 2 μm and diameter between 5 nm and 30 nm;
Adhesive resin: Quintone A100, Zeon Corporation;
Silane: 50% bis(3-triethoxysilylpropyl) tetrasulphide to 50% carbon black, X50S, Degussa-Hüls;
6PPD: N-(1,3-dimethylbutyl)-N'-phenyl-p-phenylene diamine, Chemtura Corporation;
Resorcinol: resorcinol (80%) dispersed in polymer binder, Rhenogran Resorcinol-80/GE 1323, Rhein Chemie;
HMMM: hexamethoxymethylmelamine (65%) on inert support, Cyrez 964 P.C., Cytec;
TBBS: N-tert-butyl-2-benzothiazylsulphenamide, Vulkacit ® NZ/EGC, Lanxess;
PVI: cyclohexyl-thiophthalimide, Santogard PVI, Flexsys
Curing agent: sulphur, Redball Superfine, International Sulphur Inc.

The amount of sepiolite added to sample 6, to the net 20 wt. % of quaternary ammonium salt, is equal to the decrease in the amount of carbon black from sample 5 to sample 6.

Table 7 shows the viscosity, hardness and static and dynamic mechanical properties measured with the methods and standards described in example 1 (the tensile tests were performed with rings).

TABLE 7

| SAMPLE | 5 (*) | 6 |
|---|---|---|
| Viscosity ML (1 + 4) | 69.3 | 74.5 |
| STATIC MECHANICAL PROPERTIES | | |
| Modulus 50% (MPa) | 2.7 | 3.8 |
| Modulus 100% (MPa) | 4.5 | 6.5 |
| Modulus 300% (MPa) | 16.8 | 18.9 |
| Stress at break (MPa) | 19.5 | 20.1 |
| Elongation at break (%) | 373.6 | 349.5 |
| HARDNESS | | |
| IRHD (23° C.) | 88.0 | 91.1 |
| IRHD (70° C.) | 79.9 | 83.4 |
| DYNAMIC MECHANICAL PROPERTIES | | |
| E' (23° C.) (MPa) | 21.4 | 25.5 |
| E' (70° C.) (MPa) | 16.9 | 20.6 |
| tan delta (23° C.) | 0.247 | 0.238 |
| tan delta (70° C.) | 0.190 | 0.188 |

As can be seen from the data in Table 6, it is found that introduction of the sepiolite filler, in place of an equivalent amount of carbon black, gives an increase in the rigidity of the resultant compound, manifested by the increase in the values of the moduli and of hardness, without an adverse effect on the values of hysteresis (tan delta) and of viscosity.

The invention claimed is:

1. A tire for vehicle wheels comprising:
   a carcass structure comprising at least one carcass layer;
   a belt structure applied in a radially outer position with respect to said carcass structure;
   a tread band applied in a radially outer position with respect to said belt structure; and
   at least one elastomeric material layer disposed between said tread band and said belt structure,
   wherein said elastomeric material layer extends over a surface substantially corresponding to a development surface of said belt structure or over a portion of a surface substantially corresponding to a development surface of said belt structure, and
   wherein said elastomeric material layer comprises an elastomeric material that comprises fibres formed of magnesium and/or aluminium chain silicates, said fibres having nanometric dimensions.

2. The tire for vehicle wheels according to claim 1, wherein said elastomeric material comprises a diene elastomeric polymer.

3. The tire for vehicle wheels according to claim 1, wherein said fibres have a diameter of less than 500 nm.

4. The tire for vehicle wheels according to claim 1, wherein said fibres have a diameter of less than 100 nm.

5. The tire for vehicle wheels according to claim 1, wherein said fibres have a diameter of from 5 to 50 nm.

6. The tire for vehicle wheels according to claim 1, wherein said fibres have a length less than or equal to 10 μm.

7. The tire for vehicle wheels according to claim 6, wherein said fibres have a length from 0.2 to 5 μm.

8. The tire for vehicle wheels according to claim 1, wherein said fibres are selected from sepiolite fibres, palygorskite fibres, or mixtures thereof.

9. The tire for vehicle wheels according to claim 8, wherein said fibres are sepiolite fibres.

10. The tire for vehicle wheels according to claim 1, wherein said fibres are present in the elastomeric material in an amount of from 1 phr to 20 phr.

11. The tire for vehicle wheels according to claim 10, wherein said fibres are present in the elastomeric material in an amount of from 3 phr to 15 phr.

12. The tire for vehicle wheels according to claim 1, wherein said at least one elastomeric material layer has a thickness of less than 2 mm.

13. The tire for vehicle wheels according to claim 12, wherein said at least one elastomeric material layer has a thickness of from 0.5 mm to 1.5 mm.

14. The tire for vehicle wheels according to claim 12, wherein said at least one elastomeric material layer has a uniform thickness.

15. The tire for vehicle wheels according to claim 12, wherein said at least one elastomeric material layer has a variable thickness in the axial direction.

16. The tire for vehicle wheels according to claim 1, wherein at least one additional reinforcing filler is present in the elastomeric material in an amount of from 0.1 phr to 120 phr.

17. The tire for vehicle wheels according to claim 1, wherein the additional reinforcing filler is silica.

* * * * *